United States Patent
Saito et al.

(10) Patent No.: US 11,456,167 B2
(45) Date of Patent: Sep. 27, 2022

(54) MASS SPECTROMETER AND PROGRAM FOR MASS SPECTROMETER

(71) Applicant: SHIMADZU CORPORATION, Kyoto (JP)

(72) Inventors: Maki Saito, Kyoto (JP); Yuko Kobayashi, Kyoto (JP); Tohru Shiohama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 633 days.

(21) Appl. No.: 16/468,075

(22) PCT Filed: Dec. 22, 2016

(86) PCT No.: PCT/JP2016/088340
§ 371 (c)(1),
(2) Date: Jun. 10, 2019

(87) PCT Pub. No.: WO2018/116443
PCT Pub. Date: Jun. 28, 2018

(65) Prior Publication Data
US 2019/0333750 A1    Oct. 31, 2019

(51) Int. Cl.
*H01J 49/00* (2006.01)
*H01J 49/42* (2006.01)
(Continued)

(52) U.S. Cl.
CPC ........... *H01J 49/42* (2013.01); *G01N 27/62* (2013.01); *G01N 30/7206* (2013.01); *G01N 30/7233* (2013.01); *H01J 49/0404* (2013.01)

(58) Field of Classification Search
CPC .... H01J 49/42; H01J 49/0404; H01J 49/0027; H01J 49/0009; G01N 27/62; G01N 30/7206; G01N 30/7233
See application file for complete search history.

(56) References Cited

U.S. PATENT DOCUMENTS

2008/0087809 A1* 4/2008 Russ ............... H01J 49/061
                                                     250/281
2015/0235827 A1   8/2015 Bazargan et al.
(Continued)

FOREIGN PATENT DOCUMENTS

JP    2011-257333 A    12/2011

OTHER PUBLICATIONS

First Office Action dated Apr. 21, 2021 from the China National Intellectual Property Administration in CN Application No. 201680091803.X.
(Continued)

*Primary Examiner* — David J Bolduc
(74) *Attorney, Agent, or Firm* — Sughrue Mion, PLLC

(57) ABSTRACT

A display area 60 of a display unit of a mass spectrometer shows a result of tuning. The display area 60 includes: a tuning-item displaying section 62 configured to display all tuning items and a result of whether each tuning item has been tuned; and an analyzable-condition displaying section 63 configured to display a condition under which an analysis is possible based on the result. The tuning items may be displayed respectively and individually. Alternatively, the tuning items may be displayed in a grouped manner with a plurality of tuning items in a group. Consequently, a user knows, at a glance, whether the tuning necessary for an analysis that the user intends to perform has been performed. If a necessary tuning item has not been tuned, the user immediately starts to tune (only) the tuning item. Further, a user immediately knows in a current state of tuning whether the analysis that the user intends to perform is possible. Therefore, when the analysis is possible, the user can start the analysis. When the analysis is impossible, the user can tune only the tuning item that has not been tuned and is displayed on the tuning-item displaying section 62.

10 Claims, 4 Drawing Sheets

(51) Int. Cl.
    *G01N 27/62*         (2021.01)
    *G01N 30/72*         (2006.01)
    *H01J 49/04*         (2006.01)

(56) References Cited

U.S. PATENT DOCUMENTS

| | | | |
|---|---|---|---|
| 2017/0184552 A1* | 6/2017 | Guzzonato | H01J 49/0404 |
| 2018/0218892 A1* | 8/2018 | Yamaguchi | H01J 49/0009 |
| 2019/0265213 A1* | 8/2019 | Sugimoto | G01N 30/7233 |
| 2020/0110064 A1* | 4/2020 | Sugimoto | G01N 30/7206 |
| 2021/0233755 A1* | 7/2021 | Wamsley | H01J 49/0009 |

OTHER PUBLICATIONS

Written Opinion of the International Searching Authority of PCT/JP2016/088340 dated Mar. 14, 2017.
International Search Report of PCT/JP2016/088340 dated Mar. 14, 2017.

\* cited by examiner

Fig. 5

TUNING STATE

LAST-TUNING DATE AND TIME: 2016/01/22 09:11:22
LAST-TUNING MODE: MANUAL TUNING
LAST-TUNING SAMPLE: PEG

⚠ BECAUSE TUNING HAS NOT BEEN COMPLETED, ANALYSIS IS IMPOSSIBLE UNDER CONDITIONS AS FOLLOWS:
POLARITY: NEGATIVE

TUNED PARAMETER

| | POSITIVE | NEGATIVE |
|---|---|---|
| H/W PARAMETER | 2016/01/20 13:40:55 AT | --- |
| LENS-SYSTEM VOLTAGE | 2016/01/20 13:40:55 AT | --- |
| Q RESOLUTION | --- | --- |
| Q CALIBRATION | 2016/01/22 09:11:22 MT | 2016/01/22 09:11:22 MT |
| ADVANCED SETTING OF TOF (ION STORAGE IS OFF) | 2016/01/20 13:40:55 AT | --- |
| ADVANCED SETTING OF TOF (MS, ION STORAGE IS ON) | 2016/01/20 13:40:55 AT | --- |
| ADVANCED SETTING OF TOF (MS/MS, ION STORAGE IS ON) | 2016/01/20 13:40:55 AT | --- |
| TOF CALIBRATION (WITH CID GAS) | 2016/01/22 09:11:22 MT | --- |
| TOF CALIBRATION (WITHOUT CID GAS) | 2016/01/22 09:11:22 MT | --- |

MASS SPECTROMETER AND PROGRAM FOR MASS SPECTROMETER

CROSS REFERENCE TO RELATED APPLICATIONS

This application is a National Stage of International Application No. PCT/JP2016/088340 filed Dec. 22, 2016.

TECHNICAL FIELD

The present invention relates to a mass spectrometer that is connected to a liquid chromatograph or a gas chromatograph, for example, or used alone to measure mass-to-charge ratio of samples, and a program for the mass spectrometer.

BACKGROUND ART

Mass spectrometers which ionize a sample and measure mass-to-charge ratio of the ions to perform identification or quantitative analysis of the sample are widely used to perform identification or quantitative analysis of components separated by a liquid chromatograph or a gas chromatograph.

In order to perform correct identification and quantitative analysis of components in such measurement, each constituent of a mass spectrometer needs to be in a state that is optimum for a purpose of an analysis. Therefore, a mass spectrometer is tuned (adjusted) when the mass spectrometer is first used, at constant intervals while in use, or before an important measurement. In tuning, magnitude and RF frequency of voltages applied to lens systems, quadrupole rods, a detector, and the like which constitute a mass spectrometer are adjusted to obtain a desirable mass chromatogram of a predetermined standard sample.

A mass spectrometer is generally connected to a controller that controls operations of the mass spectrometer, and analyzes data obtained by measurement. Many controllers are implemented by a dedicated program that is installed in a general computer and runs on the general computer. Prior described tuning is also performed by the program as one function of the program (or by a subprogram).

Tuning program (hereinafter referred to as "tuning subprogram") provides two kinds of tuning methods for a user which include autotuning (auto adjustment) and manual tuning (manual adjustment). In the autotuning, in order to obtain a mass chromatogram that suits a general purpose (which is the "desirable mass chromatogram"), the tuning subprogram tunes various tuning items related to constituents of the mass spectrometer based on standards predetermined for the mass spectrometer, in which a control parameter for each tuning item is determined. In the manual tuning, a user changes a control parameter of each tuning item while monitoring a mass chromatogram so that the control parameter becomes a value that allows a mass chromatogram to suit a purpose of an analysis of the user (e.g. obtaining maximum sensitivity to specific kinds of samples).

The value of the control parameter of each tuning item determined in the autotuning or the manual tuning is stored in a tuning file and is used at an analysis.

CITATION LIST

Patent Literature

Patent Literature 1: JP 2011-257333 A

SUMMARY OF INVENTION

Technical Problem

Various analysis conditions need to be set before actually analyzing a sample with a mass spectrometer. An actual analysis cannot be performed without pre-determining analysis-condition items, such as an analysis mode, e.g. a selected ion monitoring (SIM) analysis, multiple reaction monitoring (MRM) analysis, or neutral loss scan analysis, negative/positive polarity of ions to be measured, and whether to use an ion storage mode. The analysis-condition items can be variously combined, resulting in an enormous number of analysis conditions. The autotuning may be set to tune each constituent to test analysis conditions of all the combinations. Such an autotuning may be actually performed when a mass spectrometer is first used, but it requires a very long time. In normal autotuning, then, an analysis condition is specified to perform tuning within a limited range. In normal manual tuning, only preselected timing items are timed. Therefore, some tuning items have not been timed for some analysis conditions (that is, optimum control parameters have not been determined).

When a user confirms whether a mass spectrometer has been correctly tuned before the user performs an important analysis, for example, the user conventionally clicks a tuning icon displayed on a screen (or opens a menu bar and selects a corresponding item) to display a current state of tuning of the mass spectrometer. The conventional display of current state of tuning shows a phrase "tuning mode: autotuning" which means that the last tuning is done automatically, or a phrase "tuning mode: manual tuning" which means that the last tuning is done manually, as illustrated in FIGS. 2A and 2B. Therefore, a user could not easily know whether tuning items necessary for an analysis to be performed have been tuned.

A problem to be solved by the present invention is to provide a mass spectrometer that allows a user to more sufficiently and easily know a current state of tuning of the mass spectrometer.

Solution to Problem

The present invention is made to solve the above problem. A mass spectrometer according to a first aspect of the present invention includes:

a) a tuning-item displaying section configured to display, in a display area of a display unit configured to show a result of tuning, all tuning items and a result of whether each tuning item has been tuned; and b) an analyzable-condition displaying section configured to display, in the display area, a condition under which an analysis is possible based on the result.

A mass spectrometer according to a second aspect of the present invention includes, in a display area of a display unit configured to show a result of tuning:

a) a tuning-item displaying section configured to display all tuning items and a result of whether each tuning item has been tuned; and b) an unanalyzable-condition displaying section configured to display a condition under which an analysis is impossible based on the result.

In the mass spectrometer according to either aspect, all tuning items may be displayed on the tuning-item displaying section respectively and individually. Alternatively, all tuning items may be displayed on the tuning-item displaying section in a grouped manner with a plurality of tuning items in a group. In the latter case, when all the tuning items in a group have been tuned, the group has been "tuned".

The mass spectrometer according to any aspect of the present invention allows a user to know, at a glance, whether the tuning necessary for an analysis that the user intends to perform has been performed, since the tuning-item displaying section displays all tuning items and a result of whether each tuning item has been tuned. If a necessary tuning item has not been tuned, the user immediately starts to tune (only) the tuning item.

Further, the mass spectrometer according to any aspect of the present invention allows a user to immediately know in a current state of tuning whether the analysis that the user intends to perform is possible. When the analysis is possible, the user can start the analysis. When the analysis is impossible, the user can tune only the tuning item that has not been timed and is displayed on the tuning-item displaying section.

The tuning-item displaying section according to either aspect may display a last-tuning date and time of a tuning item that has been tuned.

If a tuning item has been tuned on a date and time that is much older than last tuning dates and times of other tuning items, or if a tuning item has been tuned before any trouble, the tuning item is preferably tuned again. The display of a last-tuning date and time of each tuning item allows a user to easily judge whether the tuning item needs to be newly tuned.

The tuning-item displaying section according to either aspect may display information that a tuning item which has been tuned has been autotuned or manually tuned.

For example, when a tuning item has been manually tuned, the tuning may be peculiar to the user who has performed the tuning. Accordingly, the peculiarity can be considered to judge whether the tuning item needs to be tuned again. The display of autotuning/manual tuning is preferably shown in addition to the display of a last-tuning date and time.

The above functions of the mass spectrometer according to the present invention may be implemented by a program for operating a computer of a controller of the mass spectrometer.

Advantageous Effects of Invention

A mass spectrometer according to the present invention allows a user to know at a glance whether tuning necessary for an analysis that the user intends to perform has been performed. If a necessary tuning item has not been tuned, the user immediately starts to tune (only) the tuning item. Further, the mass spectrometer according to the present invention allows a user to immediately know in a current state of tuning whether an analysis that the user intends to perform is possible. Therefore, when an analysis is possible, the user can start the analysis. When an analysis is impossible, the user can tune only the tuning item that has not been tuned and is displayed on the tuning-item displaying section.

BRIEF DESCRIPTION OF DRAWINGS

FIG. 5 illustrates another example of a display area showing a state of tuning of the triple quadrupole liquid chromatograph mass spectrometer according to the embodiment.

DESCRIPTION OF EMBODIMENTS

Figure 3:
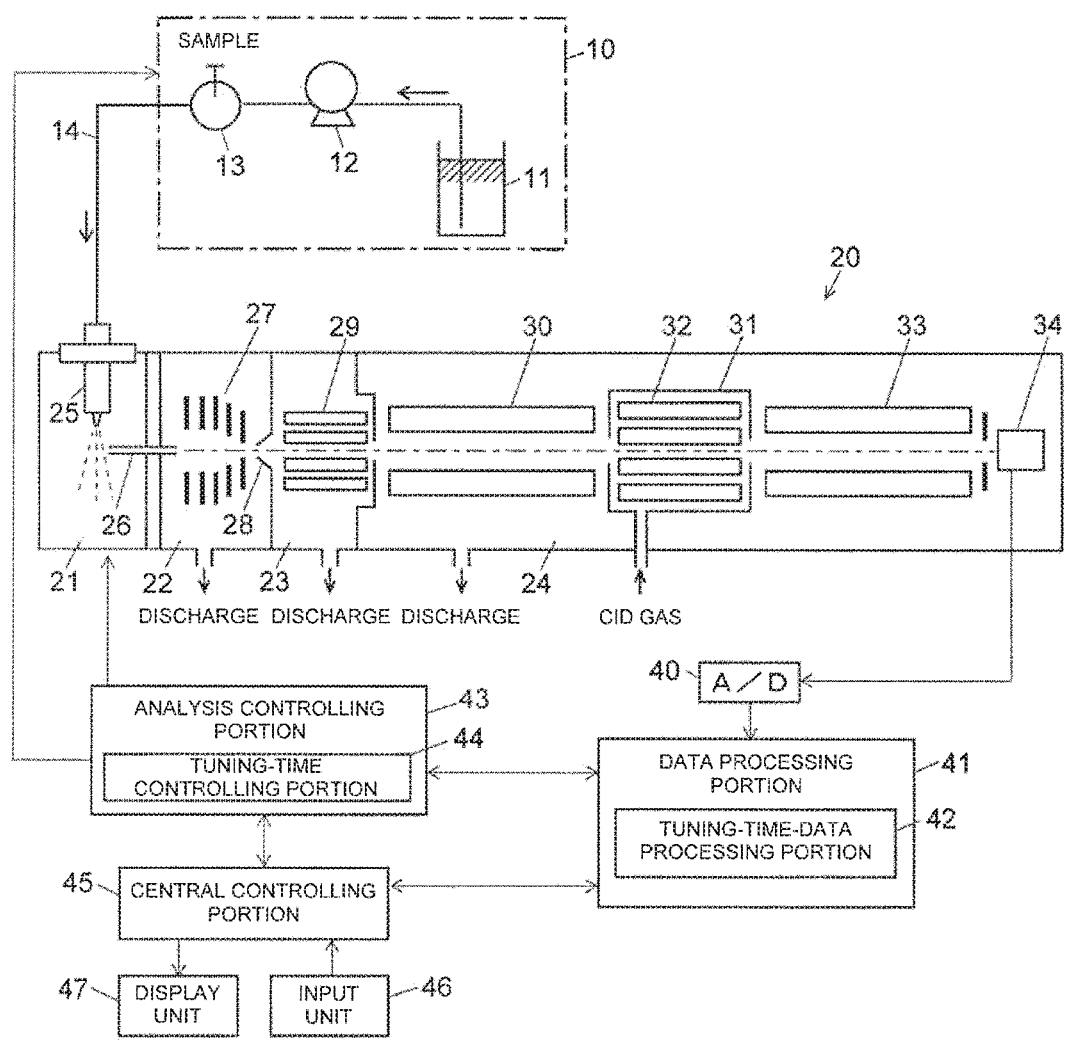
FIG. 3 is a schematic configuration diagram of the triple quadrupole liquid chromatograph mass spectrometer according to the embodiment.

Hereinafter, a triple quadrupole liquid chromatograph mass spectrometer according to an embodiment of the present invention will be described with reference to the attached drawings. FIG. 3 is a schematic configuration diagram of the triple quadrupole liquid chromatograph mass spectrometer according to the present embodiment.

A liquid chromatograph 10 includes a mobile-phase container 11 that stores mobile phase, a pump 12 that draws the mobile phase and feeds the mobile phase at a constant flow rate, an injector 13 that injects a predetermined amount of preliminarily prepared sample into the mobile phase, and an introduction pipe 14 that introduces the sample into a mass spectrometer 20 described later. The pump 12 draws mobile phase from the mobile-phase container 11, and feeds the mobile phase into the introduction pipe 14 at a constant flow rate. The injector 13 introduces a fixed amount of sample liquid into the mobile phase. A flow of the mobile phase transports the sample to the mass spectrometer 20 through the introduction pipe 14.

The mass spectrometer 20 is a multi-stage differential pumping system. The mass spectrometer 20 includes an ionization chamber 21 kept at substantially atmospheric pressure, a high-vacuum analysis chamber 24 from which a high-performance vacuum pump (not illustrated) discharges air, and first and second intermediate vacuum chambers 22 and 23 disposed between the ionization chamber 21 and the analysis chamber 24. A degree of vacuum gradually increases through the first and second intermediate vacuum chambers 22 and 23. The ionization chamber 21 contains an ESI ionization probe 25 that nebulizes the sample solution while electrically charging the sample solution. A heated capillary 26 having a small diameter connects the ionization chamber 21 with the first intermediate vacuum chamber 22 disposed subsequently to the ionization chamber 21. A skimmer 28 having a small hole at its top separates the first intermediate vacuum chamber 22 and the second intermediate vacuum chamber 23. The first intermediate vacuum chamber 22 contains an ion lens 27 that transports ions to a subsequent stage while focusing the ions. The second intermediate vacuum chamber 23 contains an ion lens 29 that transports ions to a subsequent stage while focusing the ions. The analysis chamber 24 contains a collision cell 31, a preceding-stage quadrupole mass filter 30, a subsequent-stage quadrupole mass filter 33, and an ion detector 34. The collision cell 31 contains a multi-pole ion guide 32, and is disposed between the preceding-stage quadrupole mass filter 30 and the subsequent-stage quadrupole mass filter 33. The preceding-stage quadrupole mass filter 30 and the subsequent-stage quadrupole mass filter 33 each separate ions according to a mass-to-charge ratio.

When the liquid sample reaches the ESI ionization probe 25 of the mass spectrometer 20, the ESI ionization probe 25 nebulizes the electrically-charged liquid sample from a tip of the probe 25. Electrostatic force disintegrates the nebulized electrically-charged droplets into very fine droplets. In the process, ions originating from components of the sample are ejected. The generated ions are transported to the first intermediate vacuum chamber 22 through the heated capillary 26. Then the ion lens 27 focuses the ions. The focused ions are transported to the second intermediate vacuum chamber 23 through the small hole at the top of the skimmer 28. Then the ion lens 29 focuses the ions originating from the components of the sample. The focused ions are transported to the analysis chamber 24, and are introduced into a longitudinal space of the preceding-stage quadrupole mass filter 30. APCI or APPI may naturally be used to perform the ionization, instead of ESI.

During an MS/MS analysis, a predetermined voltage (that is an RF voltage superimposed on a DC voltage) is applied to each rod electrode of both the preceding-stage quadrupole mass filter 30 and the subsequent-stage quadrupole mass filter 33, and CID gas is supplied into the collision cell 31 to keep the collision cell 31 at a predetermined gas pressure. From various types of ions introduced into the preceding-stage quadrupole mass filter 30, only ions having a particular mass-to-charge ratio corresponding to the voltage applied to each rod electrode of the preceding-stage quadrupole mass filter 30 pass the filter 30, and are introduced into the collision cell 31 as precursor ions. The precursor ions collide with the CID gas and dissociate in the collision cell 31. Consequently, various types of product ions are generated. Since a form of the dissociation depends on dissociation conditions, such as collision energy and a gas pressure in the collision cell 31, changing collision energy changes types of the generated product ions. When the various types of generated product ions are introduced into the subsequent-stage quadrupole mass filter 33, only product ions having a particular mass-to-charge ratio corresponding to the voltage applied to each rod electrode of the subsequent-stage quadrupole mass filter 33 pass the filter 33, and reach the ion detector 34 and are detected by the ion detector 34.

An A/D converter 40 converts a detection signal detected by the ion detector 34 into digital data. The digital data is input into a data processing portion 41. The data processing portion 41 includes a tuning-time-data processing portion 42 as a functional block. The tuning-time-data processing portion 42 is a characteristic element of the present embodiment. An analysis controlling portion 43 controls operations of some units, such as the liquid chromatograph 10 and the mass spectrometer 20, and includes a tuning-time controlling portion 44 as a functional block. The tuning-time controlling portion 44 is a characteristic element of the present embodiment.

The analysis controlling portion 43 and the data processing portion 41 are connected to a central controlling portion 45. An input unit 46 and a display unit 47 are attached to the central controlling portion 45. The central controlling portion 45 controls the input and output interfaces, and performs control on a level that is higher than the level of control of the analysis controlling portion 43. Part of functions of the central controlling portion 45, the analysis controlling portion 43, and the data processing portion 41 may be implemented by dedicated application software which has been preliminarily installed in a general personal computer as a hardware resource and runs on the general personal computer.

Modes of the MS/MS analysis of the mass spectrometer 20 of the triple quadrupole liquid chromatograph mass spectrometer according to the present embodiment include an MRM analysis, a product ion scan analysis, a precursor ion scan analysis, and a neutral loss scan analysis, similarly as general liquid chromatograph mass spectrometers. The modes of the MS/MS analysis of the mass spectrometer 20 also include a Q1 scan analysis, a Q3 scan analysis, a Q1-SIM analysis, and a Q3-SIM analysis, for example, as general measurement not involving dissociation of ions within the collision cell 31.

Figure 1:
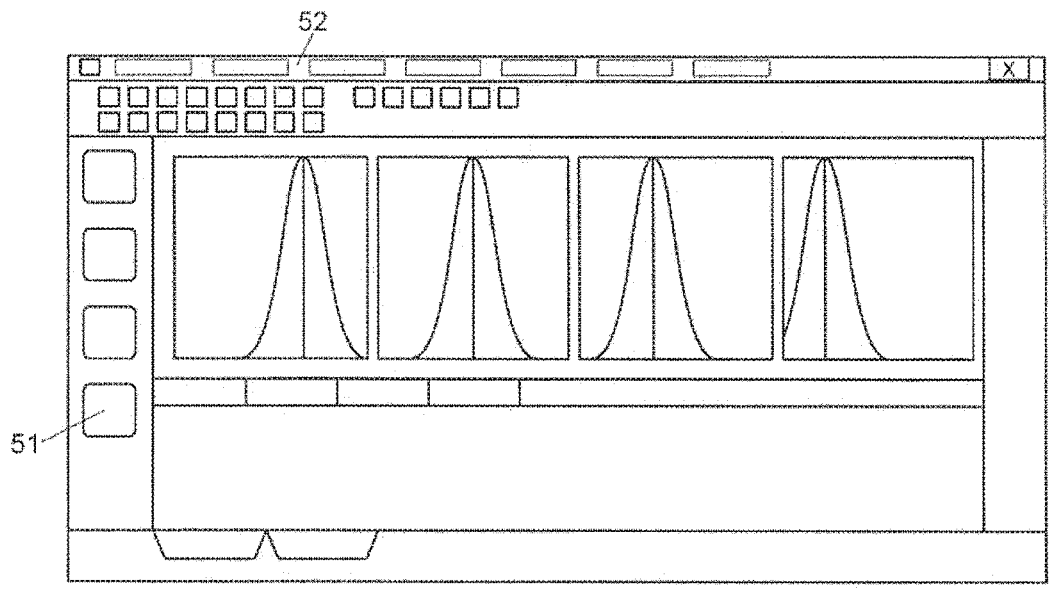
FIG. 1 is a schematic configuration diagram of a main display area on a screen of a display unit of a triple quadrupole liquid chromatograph mass spectrometer according to an embodiment of the present invention.

When a user analyzes (performs an identification or quantitative analysis of) an unknown compound with the triple quadrupole liquid chromatograph mass spectrometer according to the present embodiment in the various analysis modes, the user decides an analysis method optimum for the purpose (the decided analysis method is stored as a method file). Before actually performing the analysis, the user needs to check whether the mass spectrometer has been correctly tuned in order to certify reliability of a result of the analysis. The user starts tuning by clicking a tuning icon 51 displayed on a main display (see FIG. 1) on a screen of the display unit 47 of the central controlling portion 45 (or opening a menu bar 52 and selecting a corresponding item; the same applies the following description). The clicking causes the central controlling portion 45 to activate the tuning-time controlling portion 44 of the analysis controlling portion and the tuning-time-data processing portion 42 of the data processing portion 41.

Figure 2A:
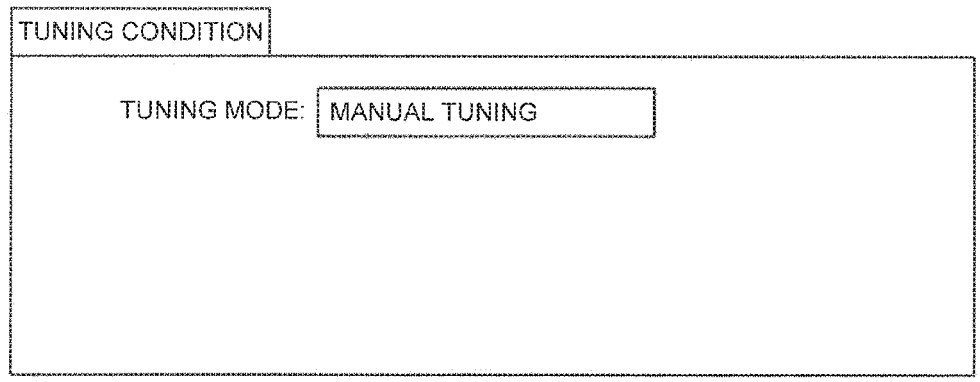
FIG. 2A illustrates a display area showing a state of tuning of a conventional mass spectrometer in which last tuning has been manually tuned.
Figure 2B:
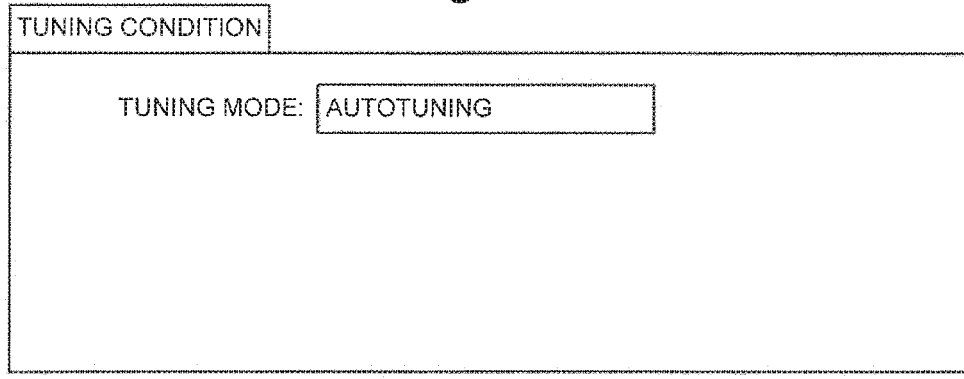
FIG. 2B illustrates a display area showing a state of tuning of the conventional mass spectrometer in which last tuning has been automated.

FIG. 2A or 2B illustrates a conventional display area showing a state of tuning of a mass spectrometer 20, as described above. The state of tuning is displayed by clicking a tuning icon 51. Such a display area does not show whether all tuning items necessary for an analysis to be performed have been tuned. The following procedures and display areas for checking a state of tuning are prepared for the triple quadrupole liquid chromatograph mass spectrometer according to the present embodiment.

First, clicking the tuning icon 51 activates the tuning-time controlling portion 44 and the tuning-time-data processing portion 42. The activated tuning-time controlling portion 44 displays a current state of tuning of the mass spectrometer on a tuning-state display area 60 (see FIG. 4) on the screen of the display unit 47. The tuning-state display area 60 may be prepared as one pane (paned window) in the main display area or may be prepared as a floating window that is independently movable on the screen of the display unit 47.

Figure 4:
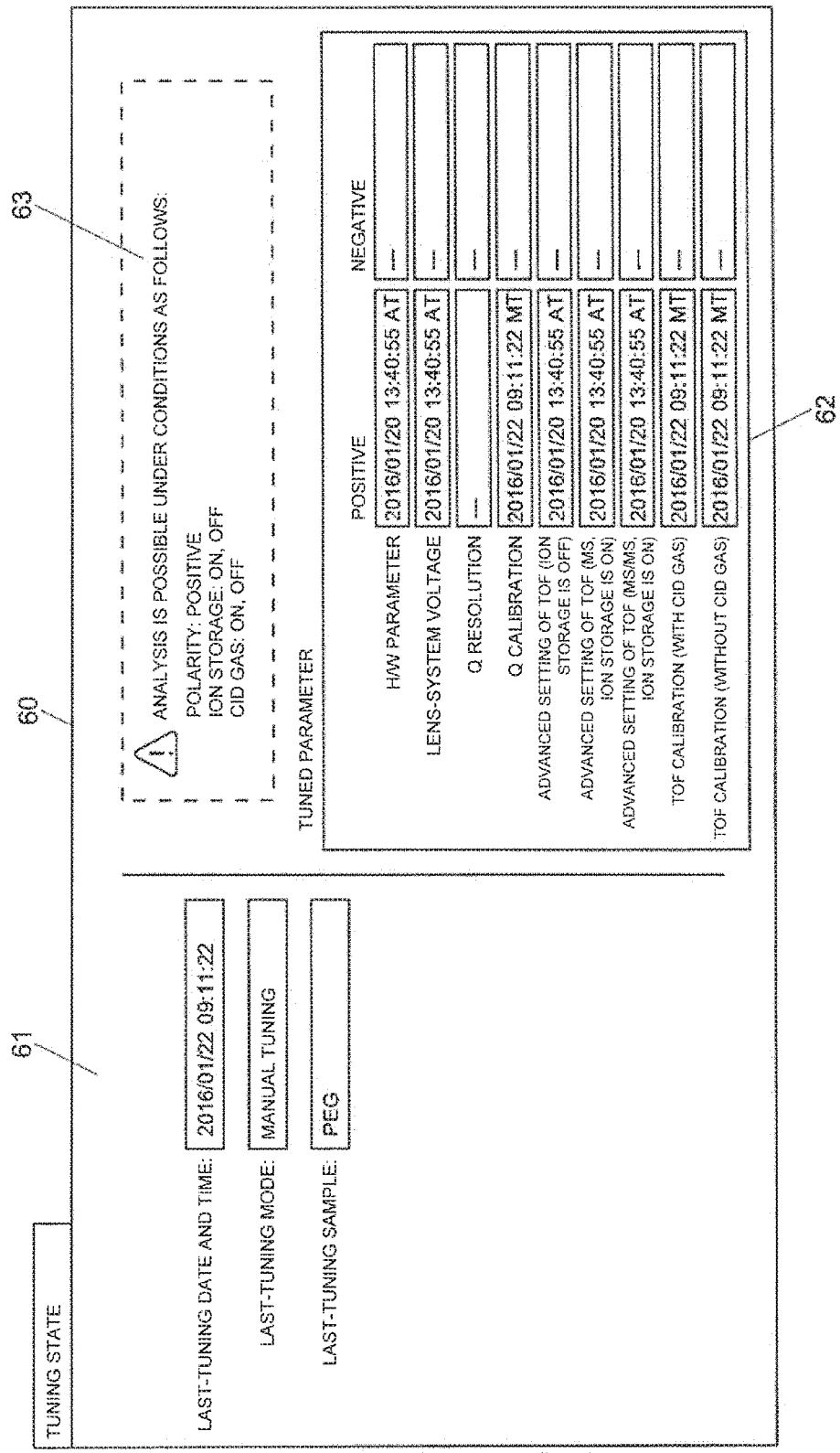
FIG. 4 illustrates an example of a display area showing a state of tuning of the triple quadrupole liquid chromatograph mass spectrometer according to the embodiment.

The tuning-state display area 60 has three main sections. A left side of the display area is an outline displaying section 61 that displays an outline of a state of last tuning. The outline displaying section 61 includes a field showing a last-tuning date and time at which "last tuning" is performed, a field showing a last-tuning mode which is a tuning mode of the last tuning, a field showing a last-tuning sample which is the kind of sample used for the last tuning, and a field showing a condition used for autotuning. FIG. 4 does not illustrate the field showing a condition since the field is not displayed for manual tuning. A lower right section of the tuning-state display area 60 is a tuned-parameter displaying section 62 that displays all tuning items of the present mass spectrometer, and a last-tuning date and time and a tuning mode (AT represents autotuning and MT represents manual tuning) of each tuning item. All tuning items of positive ion polarity and all tuning items of negative ion polarity are separately displayed. An upper right section of the tuning-state display area 60 is an analyzable-condition displaying section 63 that displays analysis conditions under which an analysis is possible in such a current state of tuning.

Some tuning items displayed on the tuned-parameter displaying section 62 of the tuning-state display area 60 according to the present embodiment, such as hardware parameters (H/W parameters) and lens-system voltages, each include a group of detailed tuning items. For example, the hardware parameters include detailed tuning items, such as a flow rate of nebulizer gas, a voltage of interfaces, and a voltage of the detector. The hardware parameters on the tuned-parameter displaying section 62 include a date and time and a mode of the last tuning of all the tuning items. When the display area has sufficient space, the tuned-parameter displaying section 62 may display the detailed tuning items as a default. Alternatively, a user's clicking of a tuning item may separately display last-tuning dates and times and modes of the detailed tuning items.

In the example of FIG. 4, Q resolution has not been tuned. No tuning items of negative ion polarity have been tuned. As to ion storage, a tuning item "advanced setting of TOF (ion storage is OFF)", a tuning item "advanced setting of TOF (MS, ion storage is ON)", and a tuning item "advanced setting of TOF (MSMS, ion storage is ON)" have been tuned. As to CID gas, a tuning item "TOF calibration (with CID gas)" and a tuning item "TOF calibration (without CID gas)" have been tuned. Therefore, the tuning-time controlling portion 44 displays a sentence "An analysis is possible under the conditions as follows: /polarity: positive/ion storage: ON, OFF/CID gas ON, OFF" on the analyzable-condition displaying section 63. The sentence means that an analysis is possible only under the condition. When an analysis that the user intends to perform comes under the conditions, and if the display of the tuned-parameter displaying section 62 satisfies the user, the user performs the analysis. However, when the tuned-parameter displaying section 62 displays a tuning item having an excessively old last-tuning date and time, or when a tuning item last manually tuned is not thought to be satisfactory tuning for an analysis that the user intends to perform, the tuning item may manually tuned, or autotuning including the tuning item may be performed. When the user intends analyzing negative ions, for example, the user sees at a glance that correct tuning has not been performed. Then new autotuning may be immediately performed under the conditions.

What described above only shows some concrete examples to describe content of the present invention. The present invention may be implemented according to other various embodiments. For example, a tuning-state display area may be such a display area as in FIG. 5. An analyzable-condition displaying section 73 which is an upper right section of an exemplary display area 70 does not display analysis conditions under which an analysis is currently possible, but displays conditions under which a correct analysis cannot be currently performed. When a tuned-parameter section 72 displays the same as the display described above, an analyzable-condition displaying section 73 in this example displays a sentence "Because tuning has not been completed, analysis is impossible under the conditions as follows: /polarity: negative", because no tuning items of negative polarity have not been tuned.

REFERENCE SIGNS LIST

10 . . . Liquid Chromatograph
20 . . . Mass Spectrometer
41 . . . Data Processing Portion
42 . . . Tuning-Time-Data Processing Portion
43 . . . Analysis Controlling Portion
44 . . . Tuning-Time Controlling Portion
45 . . . Central Controlling Portion
46 . . . Input Unit
47 . . . Display Unit
51 . . . Tuning Icon
52 . . . Menu Bar
60, 70 . . . Tuning-State Display Area
61 . . . Outline Displaying Section
62,72 . . . Tuned-Parameter Displaying Section
63,73 . . . Analyzable-Condition Displaying Section

The invention claimed is:

1. A mass spectrometer comprising:
a) a tuning-item displaying section configured to display, in a display area of a display unit configured to show a result of tuning, all tuning items and a result of whether each tuning item has been tuned; and
b) an analyzable-condition displaying section configured to display, in the display area, an analyzable condition under which an analysis is possible based on the result, wherein the analyzable condition is chosen from a plurality of stored conditions each of which is related with a plurality of tuning items, and the analyzable condition is determined based on whether a plurality of predetermined tuning items corresponding to the condition are performed.

2. A mass spectrometer comprising:
a) a tuning-item displaying section configured to display, in a display area of a display unit configured to show a result of tuning, all tuning items and a result of whether each tuning item has been tuned; and
b) an unanalyzable-condition displaying section configured to display, in the display area, an unanalyzable condition under which an analysis is impossible based on the result,
wherein the unanalyzable condition is chosen from a plurality of stored conditions each of which is related with a plurality of tuning items, and the unanalyzable condition is determined based on whether a plurality of predetermined tuning items corresponding to the condition are performed.

3. The mass spectrometer according to claim 1, wherein all tuning items are displayed on the tuning-item displaying section in a grouped manner with a plurality of tuning items in a group, and when all the tuning groups in a group have been tuned, the group has been tuned.

4. The mass spectrometer according to claim 1, wherein the tuning-item displaying section displays a last-tuning date and time of a tuning item that has been tuned.

5. The mass spectrometer according to claim 1, wherein the tuning-item displaying section displays information that a tuning item which has been tuned has been autotuned or manually tuned.

6. A non-transitory computer-readable medium storing a program for a mass spectrometer,
the program having a function including:
a) a tuning-item displaying section configured to display, in a display area of a display unit configured to show a result of tuning, all tuning items and a result of whether each tuning item has been tuned; and
b) an analyzable-condition displaying section configured to display, in the display area, an analyzable condition under which an analysis is possible based on the result, wherein the analyzable condition is chosen from a plurality of stored conditions each of which is related with a plurality of tuning items, and the analyzable condition is determined based on whether a plurality of predetermined tuning items corresponding to the condition are performed.

7. A non-transitory computer-readable medium storing a program for a mass spectrometer, the program having a function including:
a) a tuning-item displaying section configured to display, in a display area of a display unit configured to show a result of tuning, all tuning items and a result of whether each tuning item has been tuned; and
b) an unanalyzable-condition displaying section configured to display, in the display area, an unanalyzable condition under which an analysis is impossible based on the result,
wherein the unanalyzable condition is chosen from a plurality of stored conditions each of which is related with a plurality of tuning items, and the unanalyzable condition is determined based on whether a plurality of predetermined tuning items corresponding to the condition are performed.

8. The mass spectrometer according to claim 2, wherein all tuning items are displayed on the tuning-item displaying section in a grouped manner with a plurality of tuning items in a group, and when all the tuning groups in a group have been tuned, the group has been tuned.

9. The mass spectrometer according to claim 2, wherein the tuning-item displaying section displays a last-tuning date and time of a tuning item that has been tuned.

10. The mass spectrometer according to claim 2, wherein the tuning-item displaying section displays information that a tuning item which has been tuned has been autotuned or manually tuned.

* * * * *